Sept. 3, 1974　　　　　A. J. WILTSHIRE　　　　　3,833,698
METHOD FOR FORMING FIBER PREFORMS
Original Filed May 14, 1970　　　　　　　　　　　3 Sheets-Sheet 1

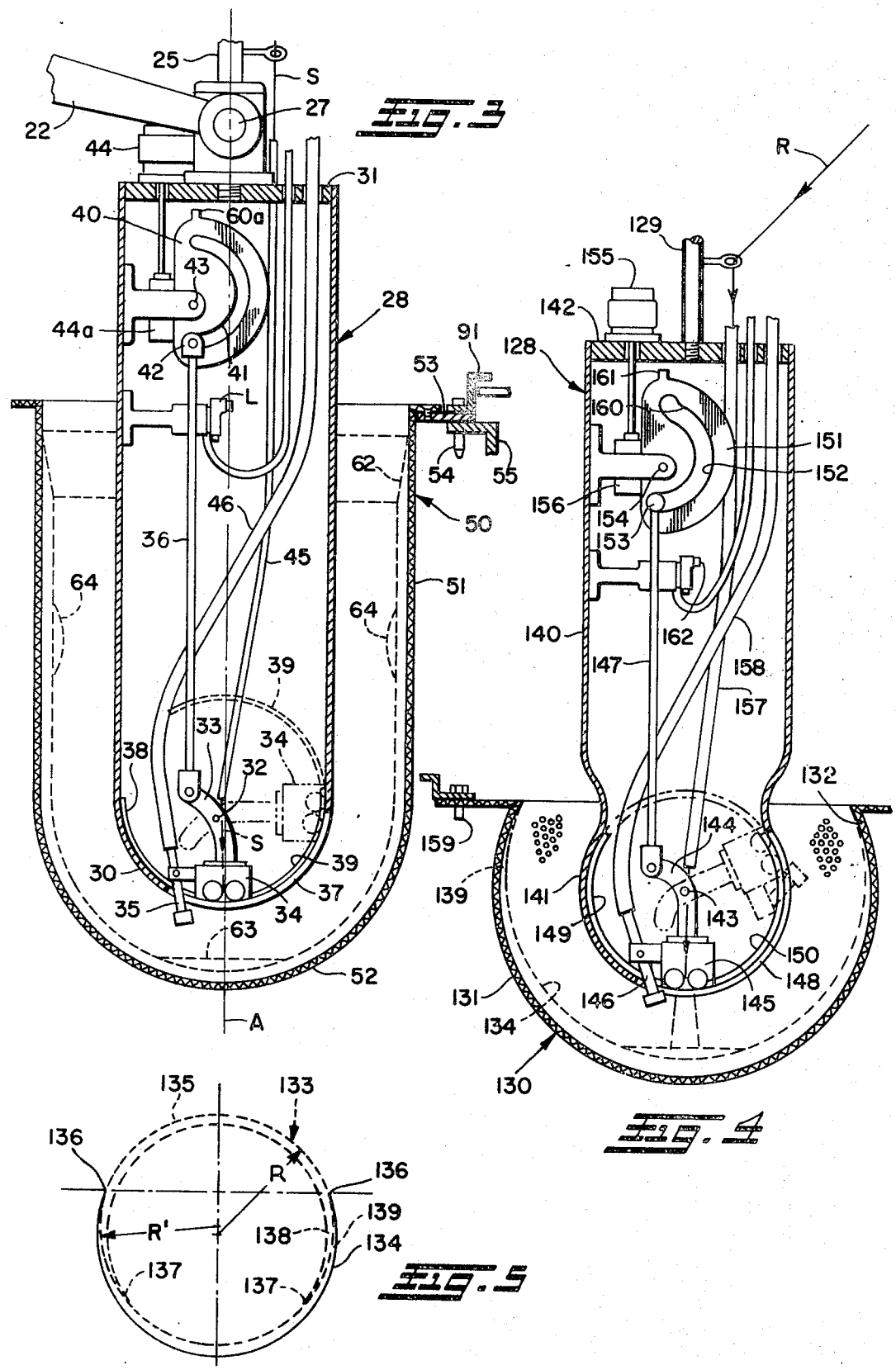

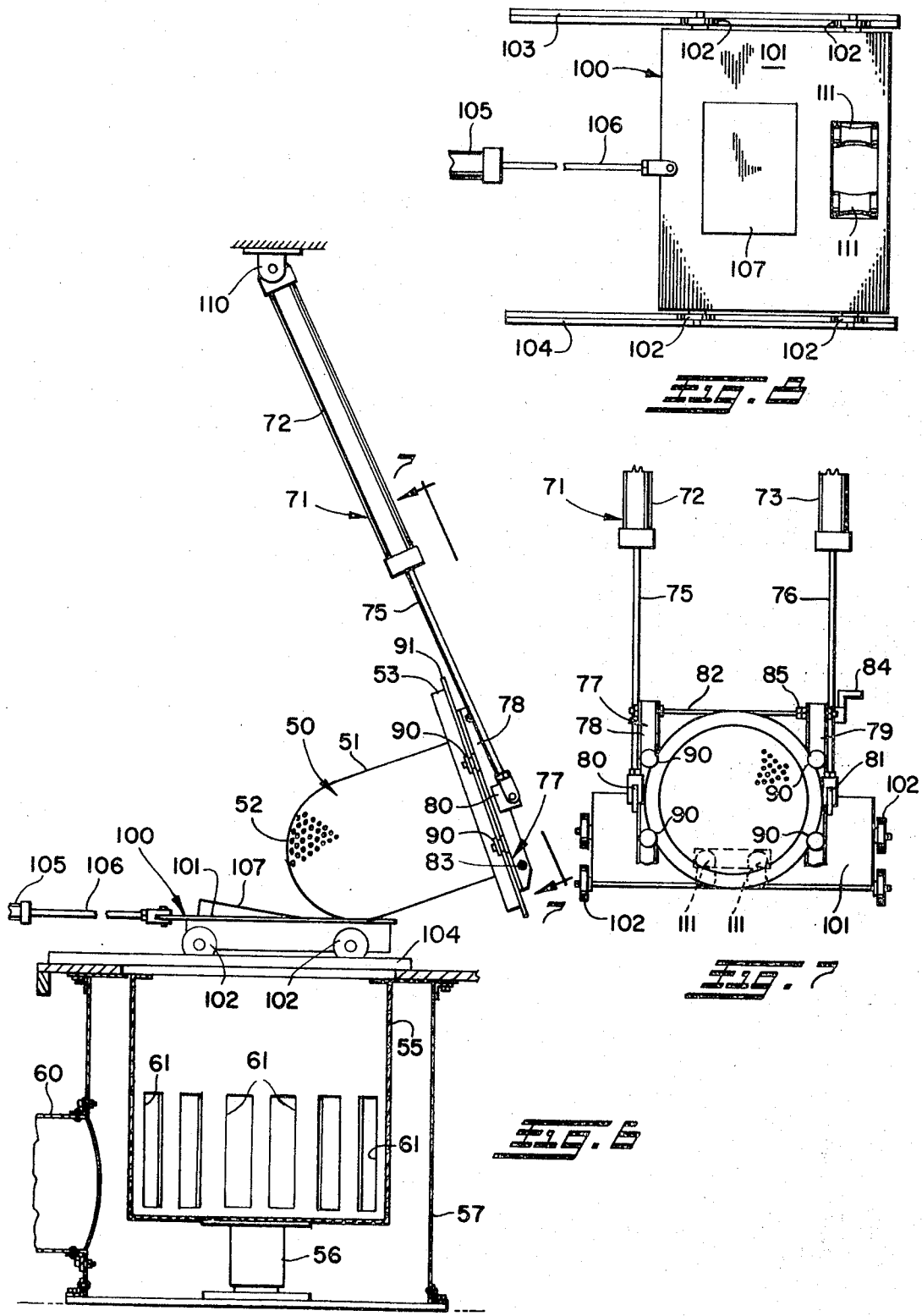

United States Patent Office 3,833,698
Patented Sept. 3, 1974

3,833,698
METHOD FOR FORMING FIBER PREFORMS
Arthur J. Wiltshire, Cleveland, Ohio, assignor to Structural Fibers, Inc., Chardon, Ohio
Original application May 14, 1970, Ser. No. 37,173, now Patent No. 3,687,587. Divided and this application Apr. 6, 1972, Ser. No. 241,718
Int. Cl. B29c 5/06
U.S. Cl. 264—91
5 Claims

ABSTRACT OF THE DISCLOSURE

A method of forming a fiber preform for use in the manufacture of fiber-reinforced molded resin articles is disclosed. In accordance with the method, a perforated screen form having an interior surface which defines the shape of the preform to be formed is rotated about its longitudinal axis within a surrounding vacuum chamber. Chopped fibers are directly deposited in a localized manner onto the interior surface of the screen form from a moving fiber dispensing point within the screen form. The fiber dispensing point is moved along a path which closely follows the rotating, longitudinal contour of the interior surface of the screen form so as to progressively, uniformly cover the entire interior surface with chopped fibers which are held in place by the air flow through the screen form and into the vacuum chamber. The deposited chopped fibers are sprayed with a heat curable resin binder which is subsequently cured.

BACKGROUND OF THE INVENTION

This application is a divisional application of applicant's co-pending application Ser. No. 37,173, filed May 14, 1970, now U.S. Pat. No. 3,687,587, granted Aug. 29, 1972.

This invention relates to the manufacture of hollow, fiber-reinforced plastic articles such as tanks and, more particularly, to the manufacture of fiber preforms which are to be impregnated with a curable resin to form the finished tank. In the manufacture of such articles, randomly oriented fibers are formed in the approximate shape of the article to be molded and held in that shape by a resin binder. The form is then encased within a rigid mold casing. An expandable bag, which will define the shape of the finished article, is placed within the laid-up form in the mold. The form is held in place in the mold by a suitably moderate pressure by expanding the bag to hold the fiber form in place against the mold, and then the fiber form is partially permeated with a thermosetting resin or the like. The bag is subsequently expanded by further inflation to compress the fiber form in such a manner as to distribute the resin throughout the matting and achieve the results of pressure molding, while at the same time avoiding migration of the fibers and destruction of the laid-up form.

The above-described process is set forth in U.S. Reissue Pat. No. 25,241 to Randolph. In the Randolph patent, the fiber form comprises a flat sheet of fiber matting which is wrapped into a cylindrical form to define the sidewall of a cylindrical tank. The top and bottom portions of the fiber form comprise preformed fiber caps. According to the teachings of Randolph, therefore, a longitudinal overlap or seam is formed by the sidewall matting and such a seam results in an unevenness in the amount of fiber-reinforcing material along the longitudinal overlapping portion of the matting. Further, since the end preforms are separately formed, an overlapping joint is required between the sidewall mat and the preforms. Here again, an irregularity in the amount of reinforcing material is present at the overlapping joints. Still further, the lapping of the joints does not provide a uniform interlocking of the fibers in the area of the lap.

In order to overcome the above problems, a technique is disclosed for forming a fiber preform having a tubular section and an integral end thereon wherein the fibers forming the preform are uniformly distributed along the entire preform so that the final product provides a uniform high strength without excessive amounts of fiber in any location, and so that a finished article has no more than one seam. This technique is set forth in copending U.S. application Ser. No. 742,692, now Pat. No. 3,654,002, which is assigned to the same assignee as the present invention.

According to the procedure of the above-identified application, an elongated screen form is rotated about its longitudinal axis. A vacuum is applied to the interior of the screen form to draw air into the form while a large number of randomly oriented chopped pieces of fiber are directed against the rotating form by a roving cutter which traverses the length of the form. The cutter is followed by a thermosetting resin binder spray to lock the fibers in place. The binder-impregnated fibers are then subjected to heat to cure the binder.

Although this technique overcomes the problems associated with a plurality of lap seams and reduces the expense of the form by eliminating the need for sidewall matting, it has been found that a considerable portion of the fibers is lost, since the screen form does not capture all of the fibers on its sidewall. Furthermore, the technique is limited to the production of a fiber preform having a substantially uniform sidewall thickness. In many tank applications, it is desirable to provide a tank having thickened wall sections so that those thickened sections will provide additional reinforcement and thread areas for tapped holes. The aforementioned technique is also limited to the production of articles having substantially straight sidewalls so that the finished preform may be removed from the screen form.

SUMMARY OF THE INVENTION

This invention overcomes many of the problems associated with techniques according to the above-identified patent and according to the above-identified application. Specifically, this invention permits the fabrication of fiber preforms having either a uniform thickness or zones of thickened wall sections so that threaded openings may be provided in the finished article. Moreover, according to the teachings of this invention, preforms may be fabricated which are cylindrical or which have non-linear sidewalls, e.g., hemispherical preforms which may be employed in the formation of spherical, fiber-reinforced plastic tanks.

In accordance with this invention, chopped fibers are deposited by a dispenser such as a roving cutter along the inside surface of a rotating screen form. The dispenser moves in an axial direction relative to the screen form and closely follows the contour of the form while the form itself is rotated about its axis. The fibers are thrown against the screen form by the action of the cutter and are held against the rotating screen form by enclosing the outside surface of the form in a vacuum chamber.

In the preferred embodiment disclosed herein, a cylindrical screen form having a closed screen bottom is disposed so that its longitudinal axis extends vertically and the screen form is rotated about its vertical axis at a speed less than the speed required to hold the fibers against its inside surface by centrifugal force. A roving cutter assembly is positioned within the screen and is caused to follow the contour of the screen from a point spaced above the lowermost portion of the screen and along a path which is spaced a uniform distance from the contour of the screen toward the top of the screen. The path followed by the roving cutter is determined by a preselected cam and cam follower assembly chosen for a particular application. In the process of cutting the roving, the chopped fiber is thrown toward the screen by the action of the cutter and is held in place by a vacuum chamber which surrounds the outside surface of the screen. After depositing fiber at the bottom of the screen, the cutter assembly is gradually withdrawn at a predetermined rate to deposit fibers along the sidewall of the screen as the screen rotates.

Also in accordance with the preferred embodiment disclosed herein, a two-station machine is provided. The two-station machine includes two vacuum chambers each surrounding its own screen form. A cutter and binder dispensing assembly is provided which deposits chopped fibers and binder in one screen form while the other screen form, which contains binder-coated fibers, is subjected to heat by the application of a heating hood to the top of the form. After the heated preform is cured, the screen form is lifted from the vacuum chamber by a preform lift and conveyor device and then presented to the operator so that the preform can be removed. The screen is presented to the operator in such a manner that it may be cleaned and reinserted into the vacuum chamber for the next preforming operation.

BRIEF DESCRIPTION OF THE DRAWINGS

FIG. 3 is an enlarged sectional view of a portion of the machine, the plane of the section being indicated by the line 3—3 in FIG. 1;

FIG. 4 is a cross sectional view similar to FIG. 3 but showing a cutter control assembly for forming hemispherical preforms;

FIG. 5 is a sectional view of a hemispherical preform made in the embodiment shown in FIG. 4 illustrated in mating relationship with a similar preform to provide a spherical preform;

FIG. 6 is a sectional view similar to FIG. 2 but showing the cutter assembly removed and showing the screen form removed by a screen lift assembly;

FIG. 7 is a view of a portion of the assembly shown in FIG. 6, the plane of the view being indicated by the line 7—7 in FIG. 6; and FIG. 8 is a plan view of the conveyor shown in FIGS. 6 and 7.

Figure 1:
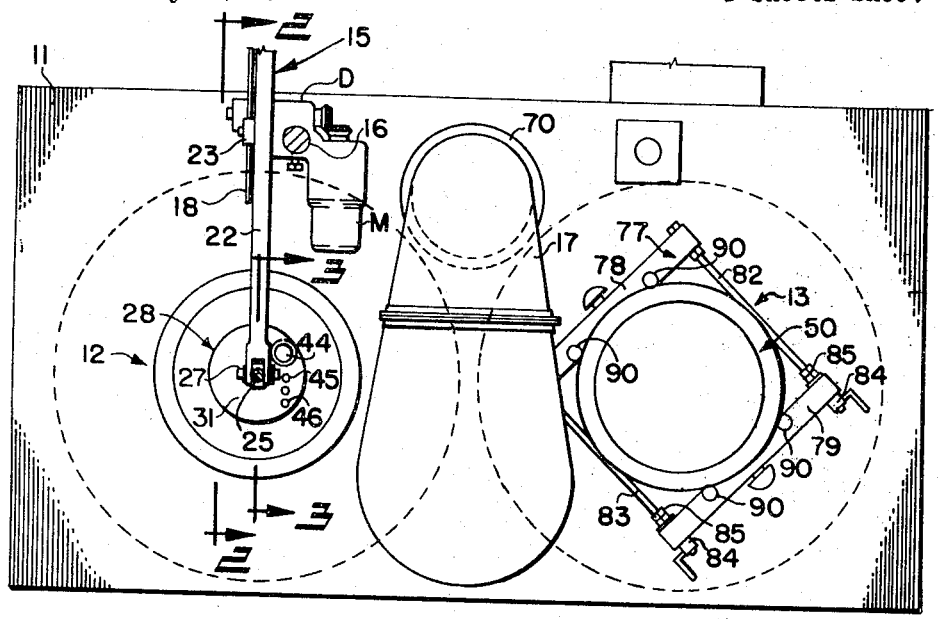
FIG. 1 is a plan view of the preform machine according to this invention, with certain duplicate parts eliminated for clarity.

Referring now to the drawings in greater detail, a platform or work surface 11 supports first and second preforming stations 12 and 13, respectively. Mounted on the platform is a hood 17 arranged to swivel with respect to the platform 11.

A control lift assembly 15 is mounted at the rear of the frame. A similar control lift assembly (not shown) is provided for the station 13.

Each control lift assembly 15 includes a vertical post support 16. Mounted on the post support 16 is a lift cam 18 driven by a motor M and a suitable reduction drive D. The motor M is a variable speed reversing motor controlled by a control device (not shown) wherein the speed of rotation of the lift cam 18 can be varied and be reversed for a purpose which will hereinafter become apparent.

The lift cam 18 has a cam follower linkage comprising a support bracket 19 fixed to the support 16, links 21 and 22, and a sliding support post 25. A cam follower roller 23 is journalled for rotation on the link 22 and the link 22 is pivotally connected at one end to the link 21. The link 21 is, in turn, pivotally connected at one end to the support bracket 19. The support post 25 is slidably received through a vertical bore 26 in the bracket 19 to guide the post 25 for vertical movement. The other end of the link 22 is pivotally connected to the post 25 by a pivotal connection 27. The vertical support post 16 extends through and is fixed to the support bracket 19. The lower end of the vertical post 16 is mounted in a bearing 20 so that the post 16 may be rotated about its vertical axis. The support post may be locked in the position illustrated in FIGS. 1 and 2 by a suitable locking means (not shown).

Figure 2:
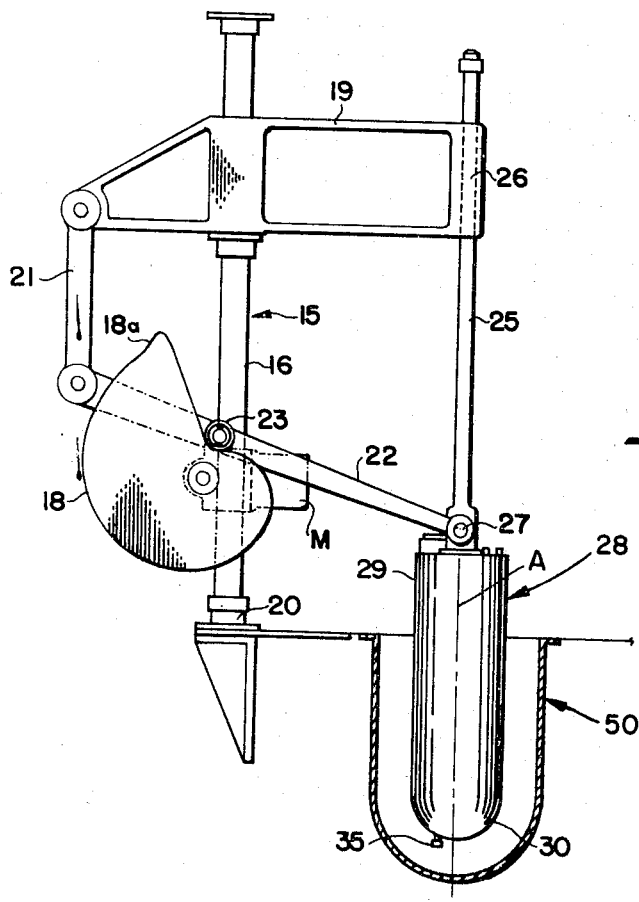
FIG. 2 is a partial section taken along the line 2—2 in FIG. 1.

Rotation of the cam 18 in a counterclockwise direction, as viewed in FIG. 2, causes the link 22 to move the post 25 upwardly. Movement of the post 25 is axial and to accommodate this axial movement, the pivotal connection between the links 21 and 22 swings slightly to the left as viewed in FIG. 2.

A fiber and binder-dispensing assembly 28 is fixed to the lower end of the post 25. As will be seen most clearly in FIG. 3, the cutter assembly 28 includes a cylindrical housing 29 having a hemispherical, closed bottom end portion 30. The top of the housing 29 is covered by a plate 31. A pin 32 extends horizontally across the housing 29 and has a link 33 pivoted to its mid-portion. One end of the link 33 carries a roving cutter 34 and a binder spray nozzle 35. The other end of the link 33 is pivotally connected to a push rod 36 which is adapted to move downwardly to pivot the link 33 in a counterclockwise direction about the pin 32. As the link 33 pivots in this manner, the roving cutter 34 and the spray nozzle 35 swing from their solid outline position illustrated in FIG. 3 to the position illustrated in phantom outline in that Figure. The cutter is mounted so that it faces a slot opening 37 in the end portion 30 of the housing 29. The nozzle 35 extends through the opening 37. Those portions of the slot 37 which are not faced by the cutter during movement of the cutter are covered by wing plates 38 and 39, which are fixed to the cutter head.

The push rod 36 is moved downwardly by a slotted cam 40. The cam 40 includes a cam track 41, which receives a cam follower 42 mounted on one end of the push rod 36. The cam 40 is fixed to a shaft 43, which is driven by a reversing motor 44 through a suitable speed reducer 44a. The link 33 is swung in a counterclockwise direction by the push rod 36 when the shaft 43 is driven in a clockwise direction to cause the cam follower 42 to follow the track 41.

The roving S is fed through a flexible guide tube 45 to the cutter 34. The cutter 34 chops the roving R into short fiber lengths. The roving S may be a continuous strand of glass fiber. Binder resin, such as a thermosetting resin, is fed to the spray head 35 through a flexible hose 46.

The stations 12 and 13 are each provided with a perforated forming screen or mandrel 50. The screen 50 has a cylindrical sidewall 51, which is open at the top and which is closed at the bottom by a hemispherical end 52. The open upper mouth of the screen 50 is provided with an annular flange 53 which carries a plurality of register pins 54. The register pins 54 extend through registry holes which are provided in a supporting collar at the top end of a rotatable drum 55. The drum 55 is mounted on a drive post 56 (FIG. 6), which is driven about its vertical axis by a suitable drive means (not shown). The drum 55, therefore, rotates the screen 50 about its vertical axis A. A vacuum chamber 57 encloses the drum 55 and is connected to a vacuum source, such as a fan, by a duct 60. Slots 61 are provided in the drum 55 so that air is drawn through the screen 50 by the vacuum source.

In operation, the screen 50 is rotated by the drum 55. The assembly 28 is positioned within the screen 50 in the manner illustrated in FIG. 3. The cutter 34 and the reversing motor 44 are energized so that the roving S is chopped by the cutter and deposited at the lowermost end of the screen 50. In the embodiment illustrated in FIG. 3, the initial movement of the cam 40 causes the cutter 34 to dwell in the position illustrated in solid outline in FIG. 3, since an initial portion of the cam track 41 follows a fixed radius with respect to the pin 43. As the cutter operates, a binder resin is forced under pressure through the feed tube 46 and through the nozzle 35 so that a light binding coating of resin is deposited on the chopped fibers. As the cam 40 continues its clockwise movement, the track 41 departs from its fixed radius and begins to force the push rod 36 downwardly to rotate the link 33 in a counterclockwise direction to thereby lay up fibers along the hemispherical portion 52 of the screen 50. When the cutter 34 reaches the position illustrated in phantom outline in FIG. 3, a projection 60a on the cam 40 strikes a limit switch L to energize the reversing motor 32. When the reversing motor is energized, the cam 18 begins its counterclockwise movement to raise the entire assembly 28 upwardly in the previously described manner. As the assembly 28 is moved upwardly, the cutter 34 is in is position illustrated in phantom outline in FIG. 3 so that fibers are deposited along the cylindrical sidewall portion 51 of the screen 50. The cam 18 is provided with an end protuberance 18a so that as the cutter 34 approaches the open end of the screen 50, the cutter is accelerated to form a tapered portion 62 on the preform.

It should be appreciated that the thickness of the preform being formed may be held constant or may be varied by changing the design of the cams 18 and 40. It is usually desirable to provide a thickened end portion 63 in the preform by the previously mentioned dwell of the cutter 34 so that the thickened end portion may be bored and tapped to receive a connection. Furthermore, it should be appreciated that the shape of the cam 18 may be varied to provide thickened sidewall portions, such as the portion 64. Such thickened sidewall portions provide zones of reinforcement for bored and tapped side access openings. The fibers are thrown against the sidewall of the screen 50 by the mechanical action of the cutter, and are held in place by the vacuum drawn through the screen 50 and, to some degree, by the uncured binder spray. Since the cutter moves axially to follow the contour of the screen, and since the screen is rotating about its vertical axis A, a helical path is traced by the cutter. The fibers are deposited on the sidewall of the screen in a random orientation.

When the assembly 28 reaches a position wherein the preform is complete, a limit switch (not shown) on the pole 25 de-energizes the cutter 34 and the resin pressure through the tube 46. The motor M is then de-energized by a second limit switch (not shown) when the end of the assembly 28 clears the level of the platform 11. After the motor M has been de-energized, the bearing 20 is unlocked and the assembly 15 is swung out of the way.

The hood 17 is mounted in a bearing 70 so that an open mouth of the hood 17 may be swung over the open mouth of the screen 50 at the station 12. The heating hood 17 is connected to a source of hot air which is drawn through the preform by the vacuum in the chamber 57. The binder resin is thereby cured and the hood is swung away from the mouth of the screen.

As may be seen most clearly in FIGS. 6 and 7, a screen lift assembly 71 is mounted above each of the stations 12 and 13. Each assembly 71 includes a pair of double-acting, fluid-actuated cylinders 72 and 73. The cylinders 72 and 73 have piston rods 75 and 76 which are pivotally connected to opposite sides of a screen lift frame 77. The screen lift frame 77 includes a pair of parallel beams 78 and 79 having plates 80 and 81 fixed thereto. The plates 80 and 81 are respectively pivoted to the piston rods 75 and 76 and the beams 78 and 79 are tied together by tie rods 82 and 83. The beam 79 may be moved toward or away from the beam 78 by a spring-biased, quick-acting clamp 84 provided on the end of each rod 82 and 83 (not shown with respect to rod 83). Thus, the beam 79 may be moved toward the beam 78 and against stop nuts 85 on the rods 82 and 83 (not shown with respect to rod 83) when the clamps 84 are tightened and the beam 79 may be moved away from the beam 78 by loosening the clamps 84.

The frame 77 further includes rollers 90 on the beams 78 and 79, which are adapted to engage the periphery of a ring 91 which is provided on the screen 50. Thus, the screen is engaged by the frame 77 by lowering the rods 75 and 76 with the beams 78 and 79 in their unclamped position. When the rollers 90 are radially aligned with the ring 91, the beams are moved together until the rollers engage the ring 91. The piston rods 75 and 76 are then retracted to lift the screen 50 out of registry with the drum 55. With the screen spaced above the drum, a conveyor cart 100 is rolled between the lifted screen 50 and the drum 55. As may be seen in FIG. 8, the cart 100 comprises a platform 101 having wheels 102 which are guided by tracks 103 and 104 between a retracted position to a position spaced above the drum 55. The cart 100 may be moved along the tracks 103 and 104 by a piston 105 having a rod 106 connected to the platform 101. The cart 100 further includes a wedge 107 which slopes downwardly toward the axis of the drum 55 and the axis of the screen 50 positioned above the drum.

With the cart in the position illustrated in FIG. 6, the screen 50 is lowered so that the curved bottom portion 52 of the screen engages the wedge 107. Further lowering of the screen 50 causes the cylinders 72 and 73 to pivot about associated upper pivotal connections 110 (only one of which is shown) and causes the screen to assume the position shown in FIG. 7. In such a position, the screen engages a pair of rollers 111 of the cart 100. With the screen 50 in this position, the operator can conveniently remove the preform from the screen. The screen may be cleaned by the operator and, to facilitate the cleaning operation, the screen may be rotated relative to the frame 77 and the cart 100.

After cleaning the screen is lifted by the cylinders 72 and 73 until it is again spaced above the cart 100. The cart is then retracted by the cylinder 105 and the screen is lowered into registry with the drum 55 so that another preform may be formed.

Referring now to FIG. 4, a fiber and binder-dispensing assembly 128 is fixed to the lower end of a post 129. The assembly 128 is employed to form hemispherical preforms which may be assembled within a spherical mold to produce fiber-reinforced, spherical containers. To produce such a spherical container, a screen form 130 is employed. The screen form 130 includes a hemispherical portion 131 and a portion 132 formed on the same radius as the screen form 130 to provide a tapered lap seam in the assembled spherical preform lay-up. Such an assembled preform lay-up 133 is shown in FIG. 5. The preform 133 includes a bottom preform 134 produced by the screen form 130 and a preform 135 produced by a similar screen form (not shown). The screen form employed to form the preform 135 has a curvature formed by a radius R which corresponds to the radius of curvature of the screen form 130. The screen form employed to produce the preform 135, however, has a different radius of curvature R' between a zone 136 and a zone 137 so that the preform 135 has a tapered lap seam 138 which is received within a tapered lap seam 139 formed in the preform 134.

To form the preform 134, the post 129 is lowered so that a fiber and binder-dispensing assembly 128 is positioned within the screen form 130. The assembly 128 includes a cylindrical, upper housing 140 and a spherical end housing 141. The top of the housing 140 is covered by a plate 142. A pin 143 extends horizontally across the housing 141 in axial alignment with a diameter of the housing 141. The pin 143 has a link 144 pivoted to its mid-portion and one end of the link 144 carries a roving cutter 145 and a binder spray nozzle 146. The other end of the link 144 is pivotally connected to a push rod 147, which is adapted to move downwardly to pivot the link 144 in a counterclockwise direction about the pin 143.

As the link 144 pivots in this manner, the roving cutter 145 and the spray nozzle 146 swing from their solid outline position illustrated in FIG. 4 to the position illustrated in phantom outline in that Figure. The cutter 145 is mounted so that it faces a slot opening 148 in the housing 141. The nozzle 146 extends through the opening 148. Those portions of the slot 148 which are not faced by the cutter 145 during movement of the cutter are covered by wing plates 149 and 150, which are fixed to the cutter head 145.

The push rod 147 is moved downwardly by a slotted cam 151. The cam 151 includes a cam track 152, which receives a cam follower 153 mounted on one end of the push rod 147. The cam 151 is fixed to a shaft 154 which is driven by a reversing motor 155 through a suitable speed reducer 156. The link 144 is swung in a counterclockwise direction by the push rod 147 when the shaft 154 is driven in a clockwise direction to cause the cam follower 153 to follow the track 152.

A continuous filament, such as the roving R, is fed through a flexible guide tube 157 to the cutter 145. The cutter 145 chops the roving R into short fiber lengths. The roving R may be a continuous strand of glass fiber. Binder resin, such as a thermosetting resin, is fed to the spray head 146 through a flexible hose 158.

The screen form 130 may be mounted within a rotatable drum (not shown) similar to the drum 55 so that register pins 159 on the screen form 130 cooperate with such a drum (not shown).

In operation, the screen form 130 is rotated by its drum (not shown). The assembly 128 is positioned within the screen form 130 in the manner illustrated in FIG. 4. The cutter 145 and the reversing motor 155 are energized so that the roving R is chopped by the cutter and deposited at the lowermost end of the screen form 130. In the embodiment illustrated, the initial movement of the cam 151 causes the cutter 145 to dwell in the position illustrated in solid outline in FIG. 4, since an initial portion of the cam track 152 follows a fixed radius with respect to the pin 154. As the cutter operates, a binder resin is forced under pressure to the feed tube 158 and through the nozzle 146 so that a light binding coating of resin is deposited on the chopped fibers. As the cam 151 continues its clockwise movement, the track 152 departs from its fixed radius and begins to force the push rod 147 downwardly to rotate the link 144 in a counterclockwise direction, to thereby lay up fibers along the hemispherical portion 131 of the screen form 130.

The cam track 152 has a quick lift portion 160 which accelerates the downward movement of the push rod 147 to form the tapered lap seam 139. When the cam 151 reaches the end of its travel after the lap seam 139 has been formed, a projection 161 on the cam strikes a limit switch 162 to thereby de-energize the cutter 145 and the spray head 146. The assembly 128 is then retracted and the preform 134 is cured in the manner previously indicated.

Although a preferred embodiment of this invention is illustrated, it is to be understood that various modifications and rearrangements of parts may be resorted to without departing from the scope of the invention.

What is claimed is:

1. A method of manufacturing fibrous preforms for use in molding fiber-reinforced plastic articles, comprising;

(a) providing a perforated form having an interior surface with perforations therethrough which defines the shape of the fibrous preform to be formed and includes an open mouth, a longitudinally extending sidewall and a concavely curved closed bottom,
    (b) rotating said perforated form about a longitudinal axis passing through said open mouth and intersecting said closed bottom,
    (c) drawing air through said perforations to pass air from the interior to the exterior of said perforated form,
    (d) dispensing fibers against said interior surface from a dispensing point within said perforated form which is spaced from said interior surface a substantially constant distance,
    (e) moving said dispensing point along a path extending from a location adjacent said intersection of said longitudinal axis and said closed bottom, across said closed bottom and along said sidewall so that said dispensing point closely follows the contour of said perforated form whereby fibers are deposited in a layer against substantially the entire extent of said interior surface in a localized, progressive deposition as said dispensing point commences movement at said location and continues to move along said path and said perforated form is rotated about said longitudinal axis thereof, said deposited fibers being held against said interior surface by the air drawn through said perforated form,
    (f) spraying said deposited fibers with a heat curable liquid resin binder, and
    (g) curing said binder to bind said fibers together to provide the fibrous preform.

2. The method of claim 1 wherein step (f) is performed simultaneously with steps (d) and (e).

3. The method of claim 1 wherein step (e) includes moving said dispensing point at a substantially uniform rate along said path to provide said layer of fibers deposited on the interior surface of said perforated form with a corresponding, substantially uniform dimension through its thickness.

4. The method of claim 1 wherein step (e) includes moving said dispensing point at a non-uniform rate along said path to provide said layer of fibers deposited on the interior surface of said perforated form with a corresponding non-uniform dimension through its thickness.

5. The method of claim 1 wherein said closed bottom has a hemispherical configuration and said longitudinal axis is vertically disposed.

References Cited

UNITED STATES PATENTS

| | | | |
|---|---|---|---|
| Re. 25,587 | 6/1964 | Wiltshire | 264—114 |
| 3,177,275 | 8/1965 | Brenner | 264—121 |
| 3,341,890 | 9/1967 | Oja | 264—121 |
| Re. 25,241 | 9/1962 | Randolph | 264—258 |

ROBERT F. WHITE, Primary Examiner

J. R. HALL, Assistant Examiner

U.S. Cl. X.R.

264—121; 128